United States Patent
Shumarayev (10) Patent No.: US 8,081,706 B2
(45) Date of Patent: Dec. 20, 2011

(54) LANE-TO-LANE SKEW REDUCTION IN MULTI-CHANNEL, HIGH-SPEED, TRANSCEIVER CIRCUITRY

(75) Inventor: Sergey Yuryevich Shumarayev, San Leandro, CA (US)

(73) Assignee: Altera Corporation, San Jose, CA (US)

( * ) Notice: Subject to any disclaimer, the term of this patent is extended or adjusted under 35 U.S.C. 154(b) by 1422 days.

(21) Appl. No.: 11/211,989

(22) Filed: Aug. 24, 2005

(65) Prior Publication Data

US 2007/0047667 A1      Mar. 1, 2007

(51) Int. Cl.
*H04L 27/00* (2006.01)
(52) U.S. Cl. ............... 375/295; 375/257; 375/219
(58) Field of Classification Search .......... 375/295, 375/257, 219
See application file for complete search history.

(56) References Cited

U.S. PATENT DOCUMENTS

| 6,526,112 | B1 | 2/2003 | Lai | |
|---|---|---|---|---|
| 6,675,327 | B1* | 1/2004 | Mobin et al. | 714/700 |
| 2002/0009169 | A1* | 1/2002 | Watanabe | 375/371 |
| 2004/0228636 | A1* | 11/2004 | Pathak et al. | 398/155 |
| 2006/0256909 | A1* | 11/2006 | On et al. | 375/376 |

FOREIGN PATENT DOCUMENTS

| EP | 1 408 611 | 4/2004 |
|---|---|---|
| WO | WO 02/054648 | 7/2002 |

* cited by examiner

*Primary Examiner* — Shuwang Liu
*Assistant Examiner* — Michael Neff
(74) *Attorney, Agent, or Firm* — Ropes & Gray LLP (57) ABSTRACT

Controllable delay circuitry is included in each channel of multi-channel, high-speed, serial transmitter and/or receiver circuitry to compensate for or to at least help compensate for possible skew (different signal propagation time) between the various channels. In systems employing CDR circuitry, the delay circuitry may be at least partly controlled by a signal derived from the CDR circuitry to make the amount of delay effected by the delay circuitry at least partly responsive to changes in data rate detected by the CDR circuitry.

7 Claims, 11 Drawing Sheets

LANE-TO-LANE SKEW REDUCTION IN MULTI-CHANNEL, HIGH-SPEED, TRANSCEIVER CIRCUITRY

BACKGROUND OF THE INVENTION

This invention relates to multi-channel data communication, and more particularly to compensating for different amounts of signal propagation delay in the various channels used in such communication.

Data communication, especially high-speed data communication, is sometimes performed using several parallel channels or lanes that originate at a transmitter (e.g., an integrated circuit device), pass through a communication medium (e.g., printed circuit board traces), and end at a receiver (e.g., another integrated circuit device). Either or both of the above-mentioned integrated circuits may be a programmable logic device ("PLD"). Data is transmitted in each channel serially, but the data in each channel is part of a larger data structure that originates at the transmitter and must be correctly reassembled by the receiver. Such correct reassembly may depend on the receiver's reassembly circuitry receiving the data from the various channels with no more than a certain, relatively small amount of delay difference between the channels. Such inter-channel delay difference may be referred to as skew.

There are many possible sources of skew. The basic transmitter circuitry itself may have some skew, especially in the packaging portion of that circuitry. The communication medium between the transmitter and receiver may be a source of skew. And the receiver circuitry (especially the packaging portion of that circuitry) may be another source of skew.

There may be a product specification for how much skew a transmitter is allowed to have in its output signals. It would therefore be desirable to provide circuitry for use in a transmitter that would help the transmitter meet such a specification. Similarly, receiver circuitry may have a limit as to how much skew it can tolerate, and augmenting that circuitry to allow it to receive signals with more than that amount of skew would increase the usability of the receiver.

SUMMARY OF THE INVENTION

The present invention has aspects that can be used in transmitter or receiver circuitry.

Transmitter circuitry in accordance with the invention includes a plurality of circuit lanes or channels. Each circuit lane transmits a respective serial data signal. Each circuit lane includes controllable delay circuitry for giving the signal in that circuit lane a controllable amount of delay to compensate for skew among the signals in the various circuit lanes.

Receiver circuitry in accordance with the invention includes a plurality of circuit channels or lanes. Each circuit lane receives a respective serial data signal. Each circuit lane includes controllable delay circuitry for giving the signal in that circuit lane a controllable amount of delay to compensate for skew among the signals in the various circuit lanes. If the receiver circuit lanes include CDR circuitry, the delay circuitry in each lane may be at least partly controlled by a signal derived from the CDR circuitry in that lane to make the amount of delay effected by the delay circuitry at least partly responsive to changes in data rate detected by the CDR circuitry.

Further features of the invention, its nature and various advantages, will be more apparent from the accompanying drawings and the following detailed description.

DETAILED DESCRIPTION

Application of the invention to transmitter circuitry will be described first. Thereafter, receiver embodiments of the invention will be described.

Figure 1:
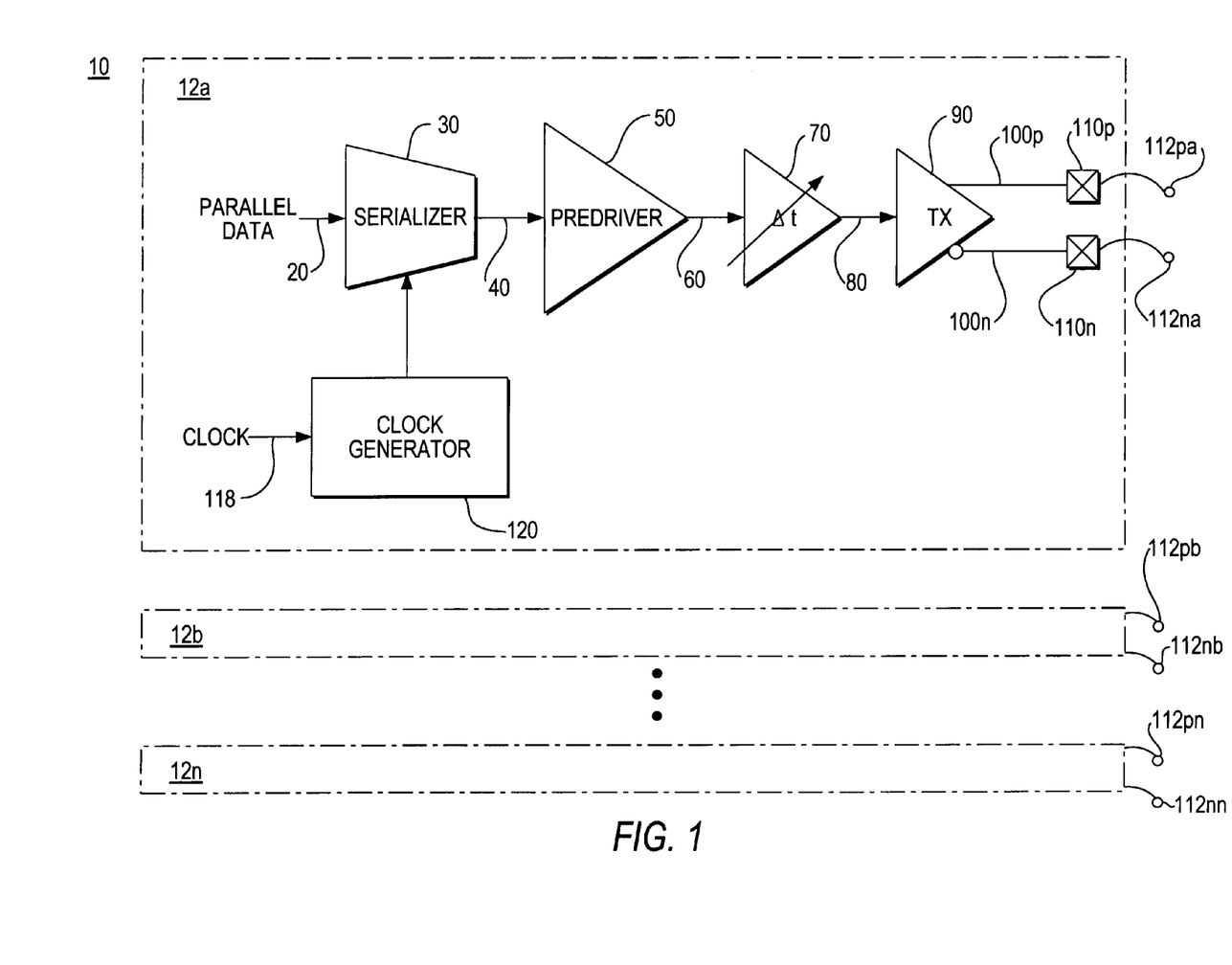
FIG. 1 is a simplified schematic block diagram of illustrative transmitter circuitry in accordance with the invention.

Illustrative transmitter circuitry 10 in accordance with the invention is shown in FIG. 1. Circuitry 10 includes several identical or substantially identical transmitter channels or lanes 12a-12n. Although only one of these channels is shown in detail in FIG. 1, it will be understood that the other channels are all identical or substantially identical to the one depicted in detail. All of channels 12 may be on a single integrated circuit device such as a PLD. Each channel receives its own parallel data 20, and the controllable delay circuitry 70 in each channel is separately controllable to add an amount of delay to each channel that can be different for the various channels. These various amounts of delay are selected and controlled to reduce the amount of skew between the serial data output signals at the output pads 110 of the various channels, or (possibly even more importantly) at the integrated circuit package output pins 112 that are connected to the output pads 110 of the various channels.

The following detailed description of representative channel 12a will be understood to apply to all of channels 12.

As shown in FIG. 1, representative transmitter channel 12a includes serializer circuitry 30, which receives (from upstream circuitry that is not shown) several data signals in parallel on several parallel data leads 20. For example, at any given time, the signals on leads 20 may represent a byte or word of digital data. (The term "byte" will generally be used herein to refer to a group of several bits that are intended to be interpreted as a unit. It will be understood that, as used herein, a byte can include any plural number of bits.) The clock signal 118 applied to clock generator circuitry 120 may have a frequency equal to the rate at which successive bytes 20 are applied to serializer circuitry 30. This frequency may be referred to as the byte rate frequency. Clock signal 118 also preferably has an appropriate and useful phase relationship to successive bytes 20. In addition to applying clock signal 118 to serializer circuitry 30 (e.g., for use in registering each successive byte 20 in that circuitry), clock generator circuitry 120 also generates from clock signal 118 a bit rate clock signal that is applied to the serial output side of serializer circuitry 30. The bit rate clock signal has a frequency that is m times the byte rate frequency, where m is the number of bits in each byte. Accordingly, the bit rate clock signal can be used (by circuitry 30) to shift out the individual bits of each byte from data 20, these bits being shifted out one after another in serial data fashion. Note that the bit rate may be in the gigahertz range (e.g., from approaching 1 Ghz to several Ghz), although this is only an example, and the invention is not limited to use at any particular frequencies.

The serial data 40 output by serializer circuitry 30 is applied to pre-driver circuitry 50. If desired, serializer circuitry 30 may output several serial data signals. (See FIG. 6 for an illustration of this type of embodiment.) The information content of these several signals may be identical to one another but they may be delayed by one bit interval (or unit interval ("UI")) relative to one another to facilitate the provision of finite impulse response ("FIR") filtering in output driver circuitry 90 (also referred to as TX circuitry 90). Pre-driver circuitry 50 buffers the signal or signals applied to it to reach the signal levels and strengths required to drive TX driver 90. Pre-driver circuitry 50 may also be used to implement slew rate control of the signal or signals being buffered. Slew rate is the steepness of the transitions between levels in a binary data signal. The higher the data rate, the greater the slew rate will need to be for accurate reception and interpretation of the data. But a high slew rate also consumes more power and has higher frequency components, so that if data is being transmitted at a lower data rate, it can be helpful to be able to decrease the slew rate. Such slew rate control may be one of the capabilities of pre-driver circuitry 50. Other possible features of pre-driver circuitry 50 are multi-stage construction that facilitates powering down all or any part of circuitry 50 that is not in use, and/or looping back (e.g., into the upstream circuitry that supplies data 20) a serial data signal or signals being processed by circuitry 50. Such looping back may be used to test proper operation of various parts of the circuitry.

The serial data output signal or signals 60 of pre-driver circuitry 50 are applied to controllable delay circuitry 70. This circuitry delays the signal or signals applied to it by a controllable amount. For example, if there are several signals 60, each delayed by one or more UIs relative to a primary (or at least earliest) one of those signals 60, then circuitry 70 delays each of these signals by the same controllable amount. (See again FIG. 6 for an illustration of this type of embodiment.) Controllable delay circuitry 70 implements the deskew function of the invention. As has been mentioned, the amounts of delay effected by the circuits 70 in the various channels 12a-12n in transmitter circuitry 10 are selected to reduce skew between the output signals 110 or 112 of the various channels. The data 20 going into the various channels 12a-12n is closely synchronized in the types of data communication that are of interest in connection with the invention. The ability to reduce or eliminate skew through these various channels and to their output pins 112 helps transmitter circuitry 10 output this data (albeit in a different (i.e., serial) form) with similarly close synchronization between the data in the various output streams.

The amount of delay effected by circuit 70 may be programmably controlled (e.g., by programming static random access memory ("SRAM") cells associated with circuitry 70). Alternatively, the amount of delay effected by circuit 70 may be more dynamically controlled (e.g., by signals that can change during normal operation of the circuitry). As still another example, the amount of delay effected by circuit 70 may be controlled by a combination of programmable and dynamic control. For example, one of several possible operating ranges may be programmably selected, and then the particular operating point within the selected range may be variably controlled by a dynamically variable control signal.

The output signal or signals 80 of delay circuitry 70 are applied to output TX driver circuitry 90. This circuitry raises the signal to the level or strength needed for an output signal from the transmitter. Circuitry 90 is shown in FIG. 1 outputting the serial data signal in differential form (via complementary output pads 110p and 110n, and therefore via complementary, packaged device, output pins 112p and 112n). Circuitry 90 may also give the signal it outputs pre-emphasis and or post-emphasis (e.g., extra energy immediately prior to and/or immediately after each transition in the level of that signal). This may be done, for example, by subjecting the signal to FIR filtering in circuitry 90, which may be based on use of multiple, differently delayed, output signals 60 as described earlier.

To briefly summarize what is shown in FIG. 1 and described above, controllable delay element 70 is added just before TX driver 90 to allow for independent delay adjustment of each lane 12a-12n with respect to the other lanes. This allows compensation for delay differences between the multiple lanes.

Figure 2:
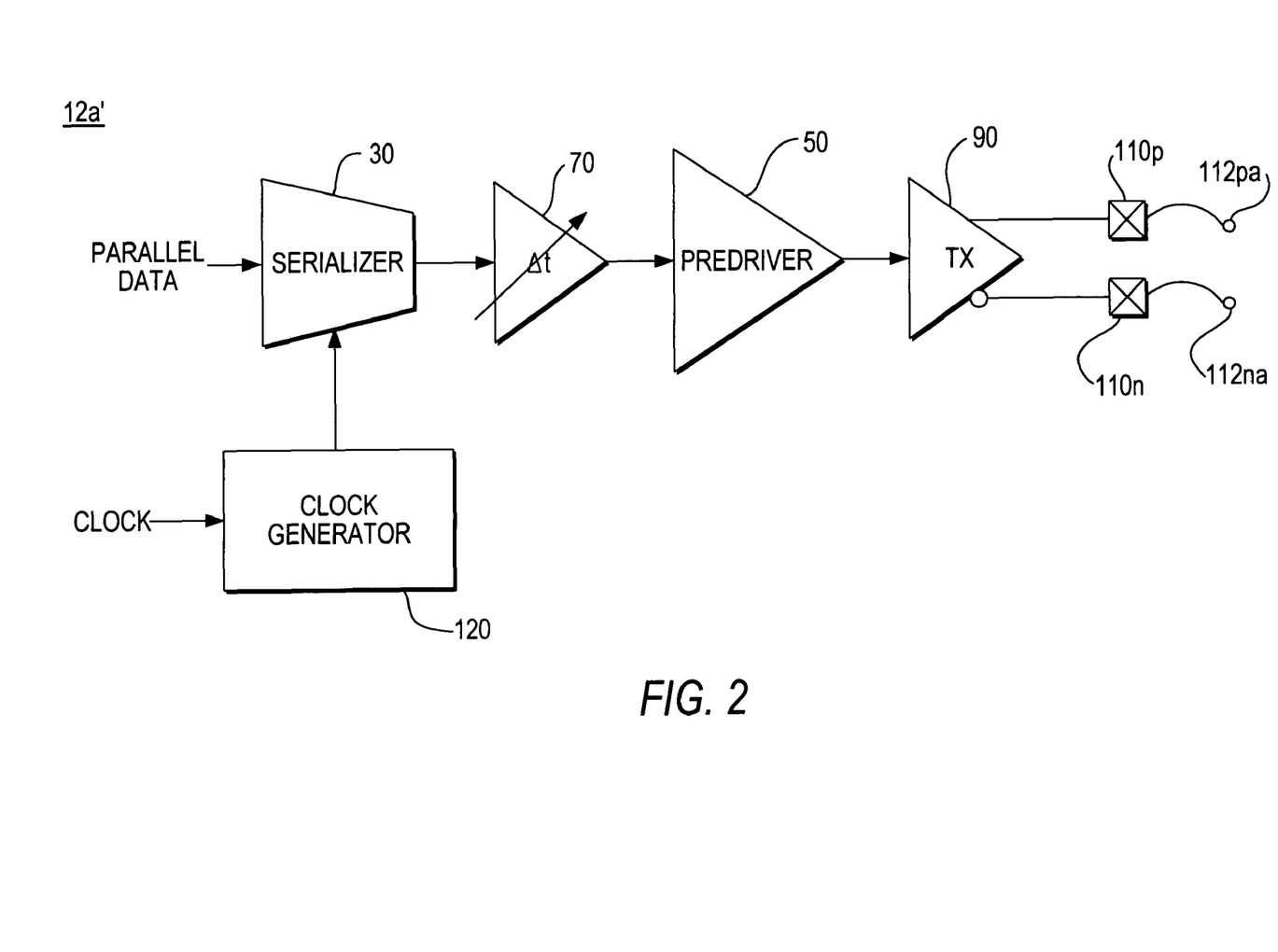
FIG. 2 is a simplified schematic block diagram of an alternative embodiment of a representative portion of the FIG. 1 circuitry in accordance with the invention.

FIG. 2 shows an alternative embodiment of one representative channel 12a' in which controllable delay circuitry 70 is included preceding pre-driver circuitry 50. This allows pre-driver circuitry 50 to re-buffer the output signal or signals of delay circuitry 70 prior to TX driver circuitry 90.

Figure 3:
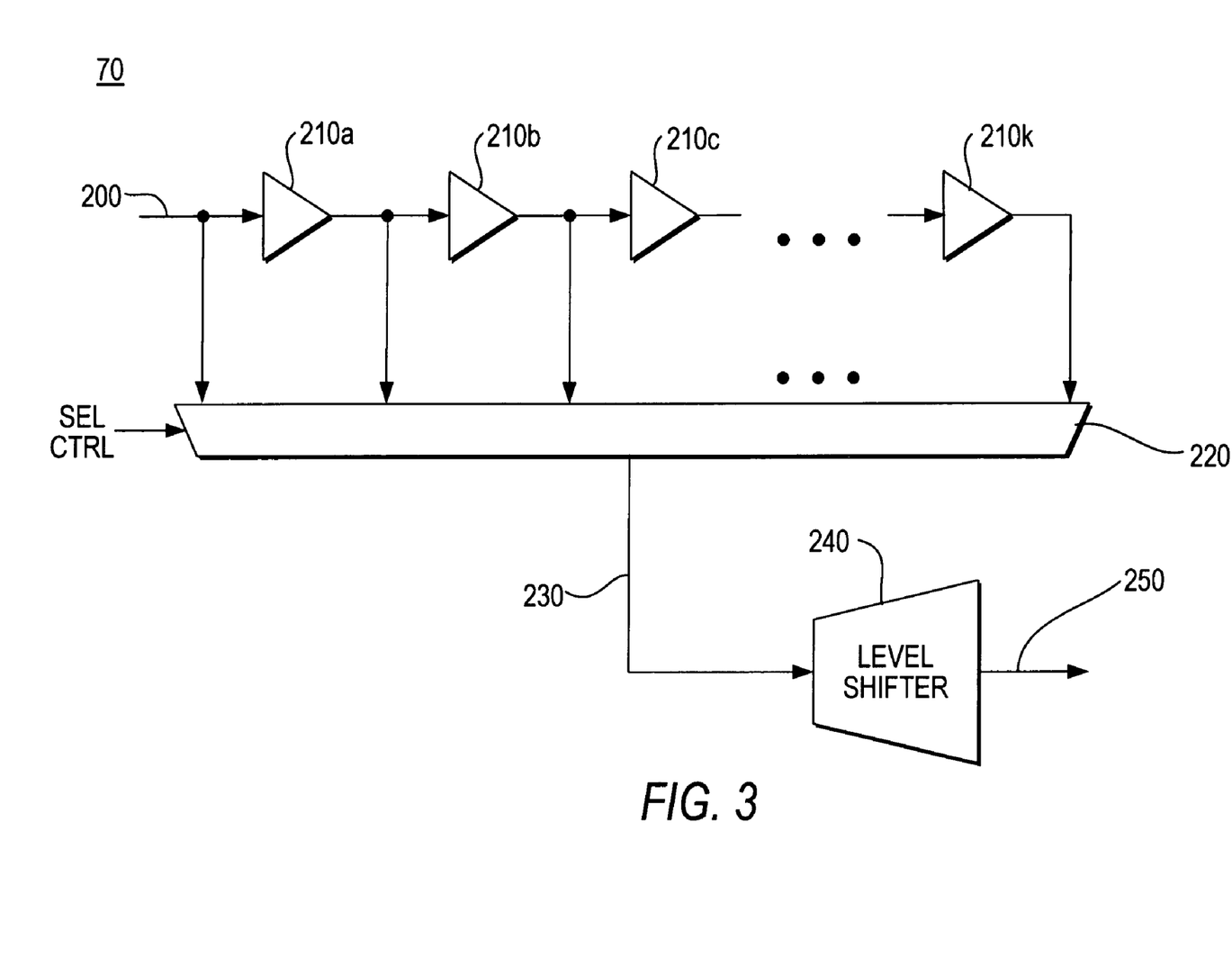
FIG. 3 is a simplified schematic block diagram of an illustrative embodiment of one of the components employed in FIG. 1 or FIG. 2 in accordance with the invention.

An illustrative embodiment of controllable delay circuitry 70 is shown in FIG. 3. In this embodiment circuitry 70 includes a plurality of delay cells 210a-210k connected in a series. The input to each of delay cells 210 (as well as the output of the last delay cell) is connected to a respective input to multiplexer 220. Multiplexer 220 is controllable by its selection control input signals ("SEL CTRL") to select any one of its input signals as multiplexer output signal 230. This signal may be applied to level shifter circuitry 240 to produce an output signal 250 that is better suited for application to TX driver 90 (FIG. 1) or pre-driver circuitry 50 (FIG. 2). From the foregoing it will be apparent that the amount of delay between the data input (200) to and the data output (250) from controllable delay circuitry 70 depends on how many of delay cells 210 are currently connected in series between that input and that output. This number is selectable via the SEL CTRL signals. Therefore the amount of delay provided by circuitry 70 is controllable.

Figure 4:
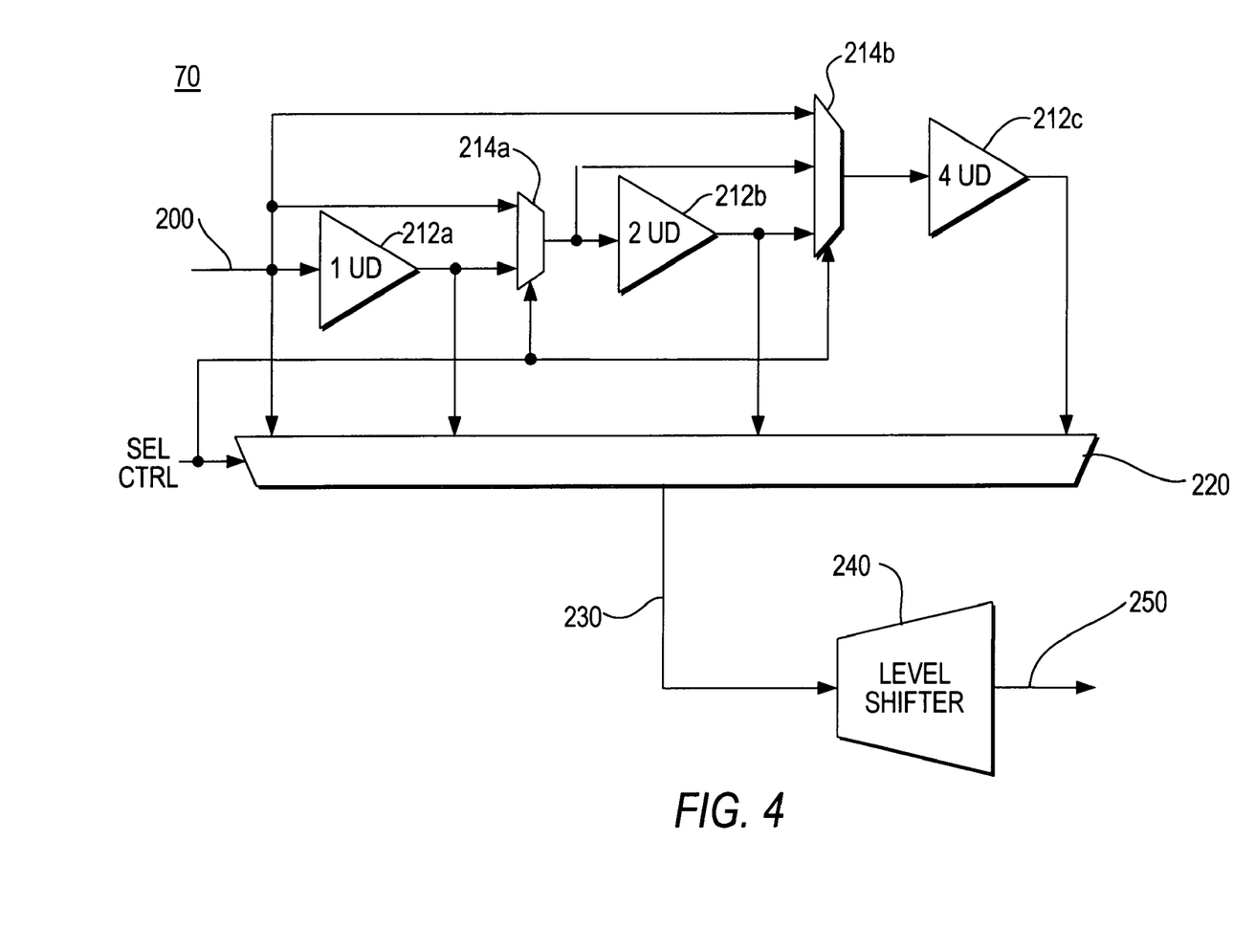
FIG. 4 is a simplified schematic block diagram of an alternative embodiment of what is shown in FIG. 3.

If desired, the increments of delay can be binary-weighted to allow for a greater number of combinations and hence finer resolution of overall delay. An illustrative embodiment of this type is shown in FIG. 4. In this embodiment delay cell 212a has one unit of delay ("1 UD"), delay cell 212b has two units of delay ("2 UD"), and delay cell 212c has four units of delay ("4 UD"). Multiplexer 214a allows either input signal 200 or the output signal of delay cell 212a to be applied to delay cell 212b and an input of multiplexer 214b. Multiplexer 214b allows any one of input signal 200, the output signal of multiplexer 214a, or the output signal of delay cell 212b to be applied to delay cell 212c. Multiplexer 220 can select input signal 200 or the output signal of any of delay cells 212a-c as output signal 230. Accordingly, the circuitry shown in FIG. 4 can delay signal 200 by any integer number of UDs from 0 through 7, depending on how signal 200 is routed through the various elements shown in FIG. 4. For example, to produce a delay of 6 UD, signal 200 bypasses delay cell 212a via multiplexer 214a, and then passes successively through elements 212b, 214b, 212c, and 220 to reach lead 230. Selection control signals SEL CTRL control the selections made by all of multiplexers 214 and 220 to achieve the amount of delay desired.

The number of binary-weighted delay stages 212 shown in FIG. 4 is only illustrative, and it will be understood that any number of such stages can be used as desired. Those skilled in the art will recognize that there is some redundancy (at least logically) in the routing and multiplexing shown in FIG. 4. For example, the upper-most input to multiplexer 214b is at least logically redundant with the middle input to that multiplexer because signal 200 can alternatively reach that middle input via multiplexer 214a. Also the first two choices that multiplexer 220 can make are logically redundant with the choice made by multiplexer 214a. The circuit arrangement shown in FIG. 4 is chosen for illustration because it may be easier to see the various delay options available with this type of circuitry. But other circuit arrangements can be used to achieve the same or similar results.

Another way that accurate delay can be generated is to use bandgap current as shown, for example, in U.S. patent application Ser. No. 10/935,867, filed Sep. 7, 2004, which is hereby incorporated by reference herein in its entirety.

Yet another way to implement controllable delay circuitry 70 is to create analog adjustment of delay by changing power supply voltage on a chain of delay cells. This approach is illustrated by FIG. 5.

Figure 5:
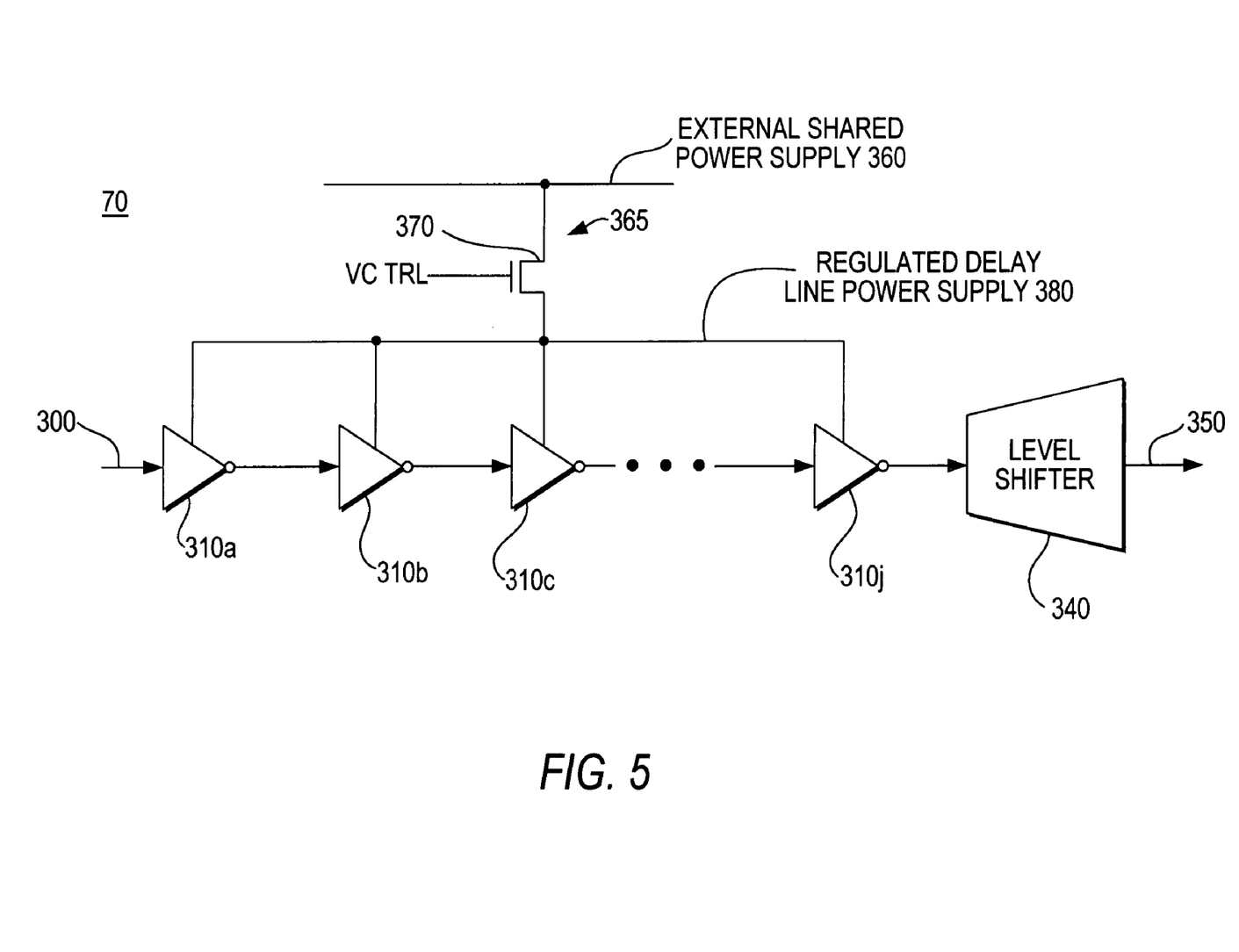
FIG. 5 is a simplified schematic block diagram of another alternative embodiment of what is shown in FIG. 3.

In the embodiment shown in FIG. 5 controllable delay circuitry 70 includes a plurality of delay cells 310a-310j connected in series. The data signal 300 to be delayed is applied to the first of these delay cells. The output signal of the last delay cell is applied to level shifter circuitry 340 (similar to circuitry 240 in FIG. 3) to produce a delayed data output signal 350 for application to TX driver 90 (FIG. 1) or pre-driver 50 (FIG. 2). The amount that each of cells 310 delays the signal applied to it is dependent on the level of the power supply signal on bus 380. For example, the higher the voltage on bus 380, the less each of cells 310 delays the signal applied to it. Bus 380 gets its signal from power supply bus 360 via transistor 370. The more strongly transistor 370 is turned on by its control signal VCTRL, the closer the voltage on bus 380 will be to the voltage on bus 360. Accordingly, the level of the VCTRL signal determines the amount of time that a data signal is delayed by the depicted circuitry in passing from input lead 300 to output lead 350.

The approach shown in FIG. 5 may be of particular interest because it offers an inherent noise suppression mechanism. This can be important in high data rate transceivers. Consider for a moment a delay line of delay "T" operated from a power supply with nominal voltage "V". Furthermore, consider sharing such a power supply between multiple transceivers in a multi-channel integrated PLD system. Any perturbation on such a shared supply of amount "DV" would result in delay line change by amount "DT", where DT could be approximated as T*DV/V. Hence, as we have to build a longer delay chain to compensate for larger external skew, it becomes more sensitive to noise on a shared supply. Instead of dedicating supply (which actually could be done in a small system), one can take advantage of such a strong delay-dependence and place either regular or native NMOS transistors between an external shared supply and the power supplies of the delay cells. Now, by controlling VCTRL for each delay cell, one can regulate voltage and hence delay of each delay group without impacting another group because of the superior noise rejection of this structure.

Note that further protection could be achieved by placing an active filter between regulator 370 and the shared supply 360 (e.g., at the location indicated by arrow 365 in FIG. 5). This would basically "shield" transistor 370 from more supply noise.

Level shifter 340 is typically needed after the delay cell chain to restore voltage back to TX driver level.

Although FIGS. 1 and 2 suggest that the data signal may first become two differential signals at the outputs of TX driver 90, differential signalling may begin upstream from that component. In that event delay chains could be placed on the differential legs of the pre-driver path. (See FIG. 7 for an illustration of this type of embodiment.) This would allow individual channel duty cycle correction by adjusting delay of one differential leg slightly differently than the other differential leg. When combined with calibration circuitry, this could compensate for variation in loading (i.e., loading of one differential leg more than the other). The calibration referred to here calibrates each channel for its individual variation in loading. Such calibration (which is not part of this invention) can be done with dedicated circuitry and/or with control from associated PLD circuitry.

The regulated approach shown and described above allows analog control of delay via VCTRL. This is turn allows very fine granularity of delay settings that would not be possible via a multiplexed line.

Assuming transmission in the gigahertz range, delay should be targeted to be in the neighborhood of 200 ps, nominally, to cover chip lane-to-lane variation and to allow for some board level flexibility.

The delay cells employed can be either single-ended or differential. The latter may be preferred as offering better matching to signal levels of other components in the circuitry. It may also be possible to use delay cells from one or more on-chip voltage controlled oscillators (VCOs) to maximize use of available circuitry.

Figure 6:
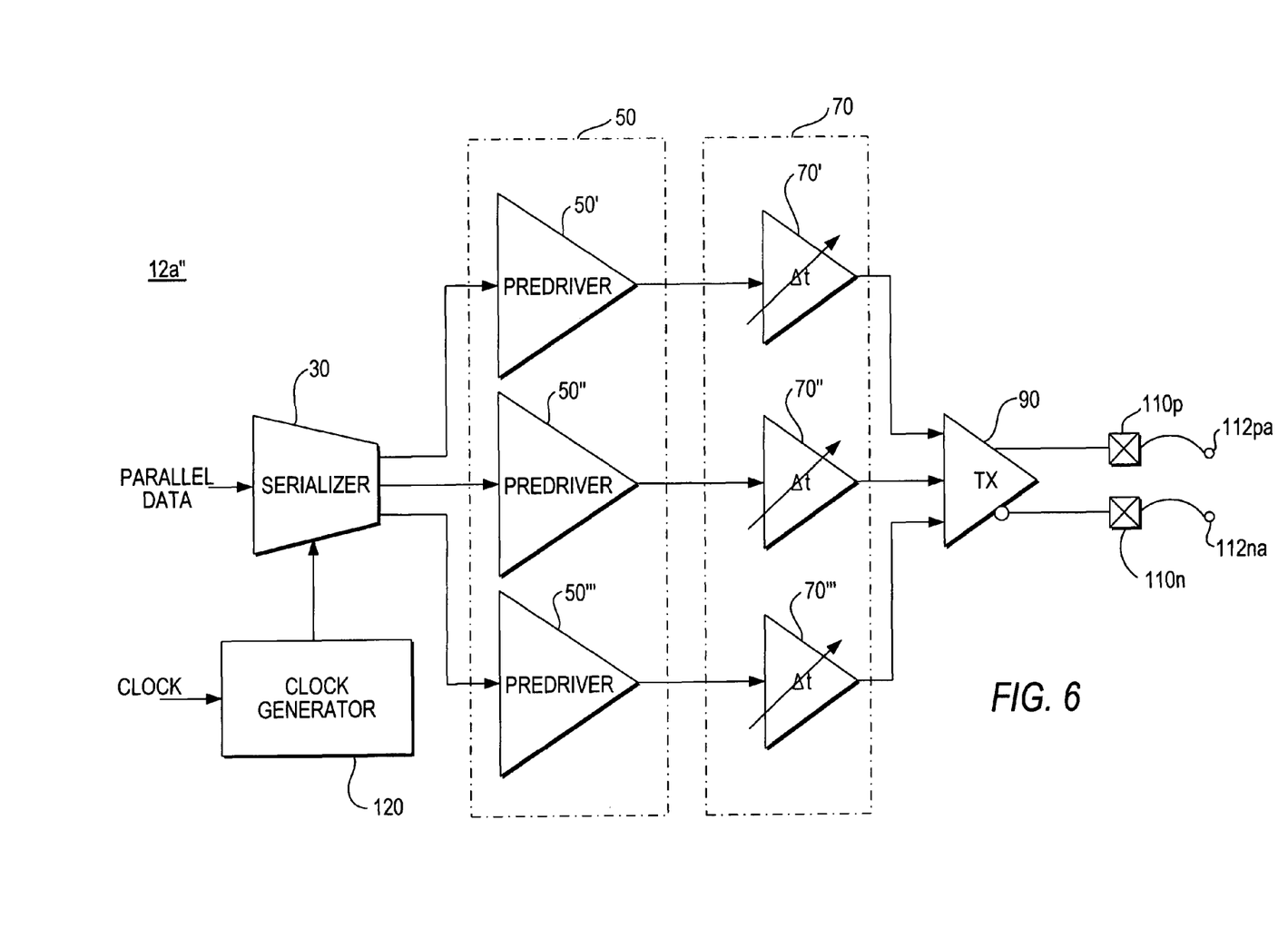
FIG. 6 is a simplified schematic block diagram showing an illustrative embodiment of a possible feature of the invention in a representative portion of circuitry of the type shown in FIG. 1
Figure 7:
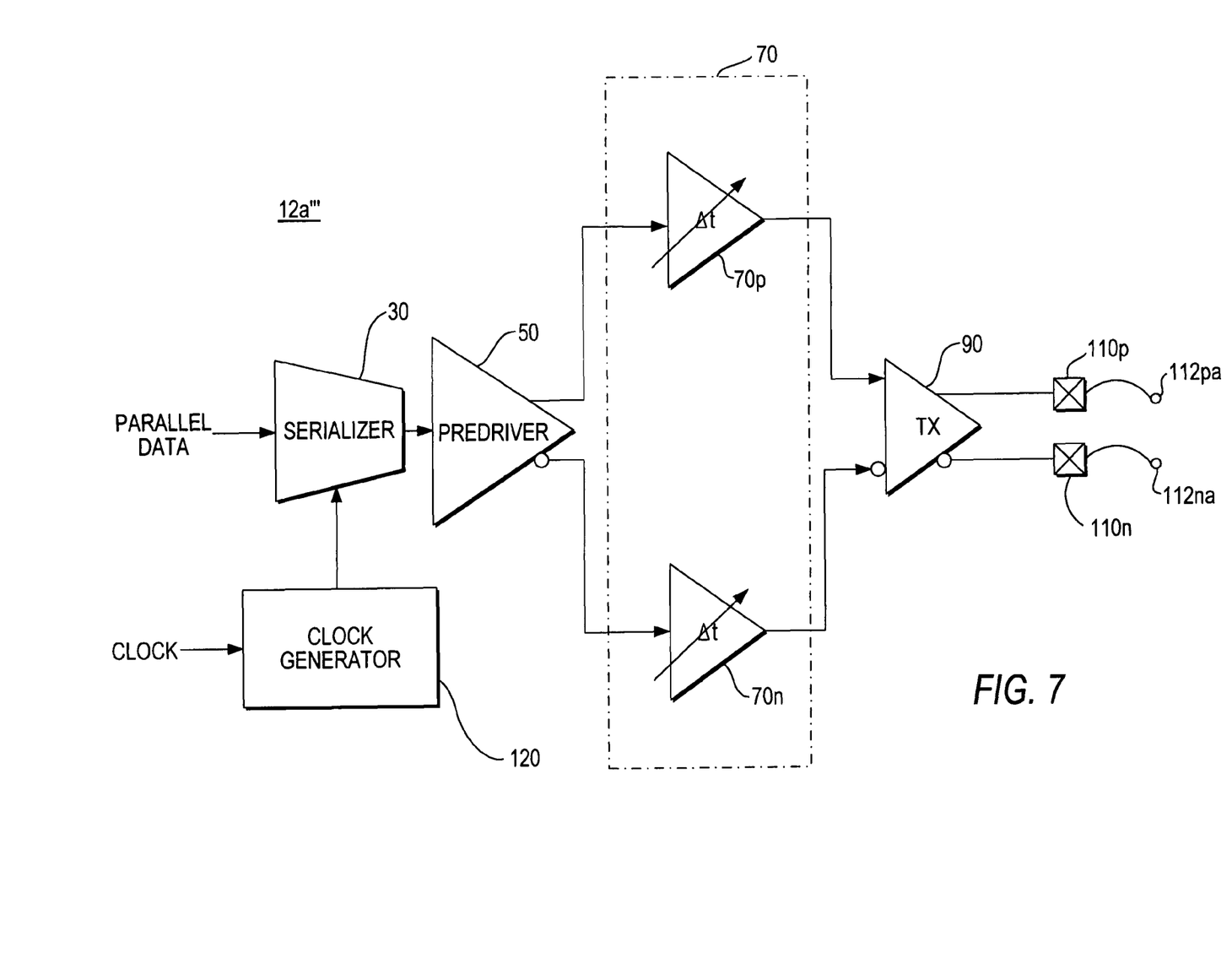
FIG. 7 is a simplified schematic block diagram showing an illustrative embodiment of another possible feature of the invention in a representative portion of circuitry of the type shown in FIG. 1.

FIGS. 6 and 7 show only one possible way of implementing the features they illustrate. In FIG. 6, for example, the order of pre-driver circuitry 50 (including pre-driver subcircuits 50', 50", and 50''') and controllable delay circuitry 70', 70", and 70''') could be reversed. The same in true for possible reversal of the order of pre-driver circuitry 50 and controllable delay circuitry 70 (including controllable delay subcircuits 70p and 70n) in FIG. 7. In the latter case, this would mean having serializer circuitry 30 provide differential output signals.

Reverting to FIG. 6, all of delay circuits 70', 70", and 70''' can be controlled in common to provide the same amount of delay. Alternatively, these circuits can be controlled separately to provide different amounts of delay. This latter possibility may be attractive to additionally compensate for local skew due to slight differences in the operation of pre-driver circuits 50', 50", and 50'''. The number of subchannels (three) shown in FIG. 6 is only illustrative. Only two, or more than three, subchannels may be employed, as desired. The features shown in FIG. 6 can be combined with the features shown in FIG. 7 if desired. Any of delay subcircuitries 70', 70", 70''', 70p, and 70n in FIGS. 6 and 7 may be constructed as shown in FIGS. 2-5 and/or as described earlier in this specification.

Figure 8:
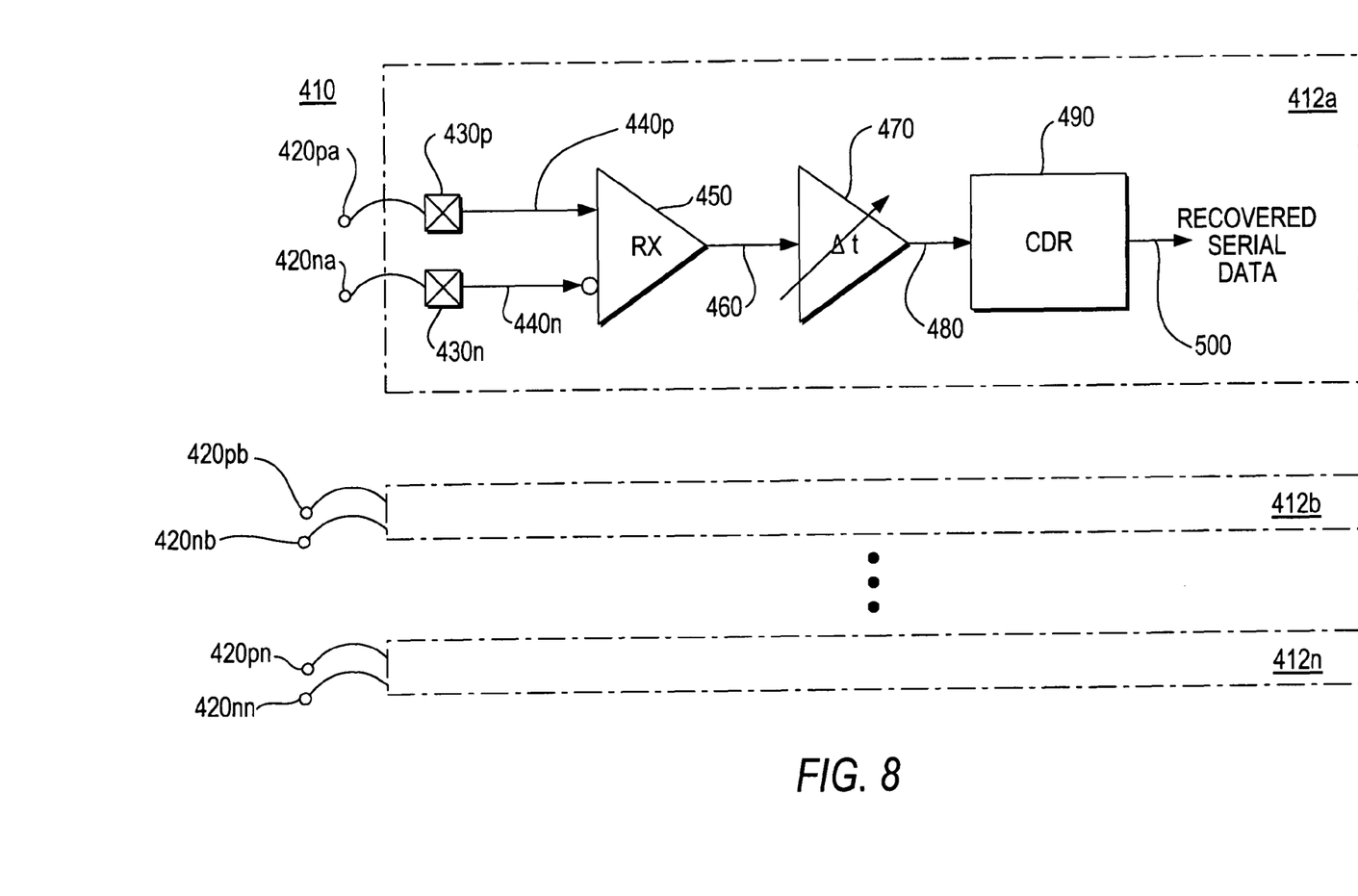
FIG. 8 is a simplified schematic block diagram of illustrative receiver circuitry in accordance with the invention.

An illustrative embodiment of receiver aspects of the invention is shown in FIG. 8. In this embodiment receiver circuitry 410 includes several identical or substantially identical channels or lanes 412a-412n. Each channel 412 receives a serial data signal, such as may be output by a respective one of transmitter channels 12 in FIG. 1. FIG. 8 shows the input to each channel 412 being a differential signal pair applied to integrated circuit package pins such as 420pa and 420pn in representative channel 412a. From pins 420, these signals are applied to differential input pads 430p and 430n of the integrated circuit per se. (Only representative channel 412a is shown and described in detail—it being understood that each of the other channels 412b-412n is identical or substantially identical.)

From differential input pads 430 the incoming differential signal is applied via leads 440p and 440n to the differential input terminals of input buffer or driver 450 (also sometimes referred to as RX driver 450). The single-ended output signal of RX driver 450 is applied via lead 460 to controllable delay circuitry 470. As will be discussed in more detail below, delay circuitry 470 may be similar to any of the delay circuitries 70 shown in any of the earlier FIGS. herein and/or as described earlier herein.

The output signal 480 of delay circuitry 470 is applied to clock and data recovery ("CDR") circuitry 490. CDR circuitry may be known circuitry for recovering both a clock signal and data from an applied serial data signal. The serial data output signal 500 of CDR circuitry 490 is typically applied to other known circuitry for such purposes as deserialization, decoding, decryption, and/or channel bonding (i.e., final synchronization between the signals in the several channels 412a-412n). The circuitry shown in FIG. 8, together with deserializer circuitry may be in the so-called physical medium attachment or PMA sublayer of the integrated circuit (e.g., the PLD) that includes the FIG. 8 circuitry. The above-mentioned decoding, decryption, and/or channel bonding circuitry may be in the so-called PCS or physical coding sublayer portion of the integrated circuit. Output signals of the PCS circuitry may be applied to further processing circuitry on the integrated circuit. For example, this further processing circuitry may include programmable logic core circuitry in cases in which the integrated circuit is a PLD.

The circuit arrangement shown in FIG. 8 is suitable for fine skew adjustments (e.g., in the tens and/or hundreds of ps range when the circuitry is operating at serial data rates in the gigahertz range. Controllable delay circuitry 470 is added just before CDR circuitry 490 to allow for fine delay control of each channel. CDR circuitry 490 automatically samples the center of the "eye" of the signal it receives. Accordingly, delay circuitry 470 can compensate for fine differences in (1) TX chip channel-to-channel skew, (2) slight board skews (i.e., in printed circuit board connections between the TX chip and the RX chip), and (3) RX chip channel-to-channel skew. Several techniques can be used to generate fine increments of delay via delay circuitry 470 (similar to possible constructions of above-shown and/or above-described implementations of TX delay circuitry 70, albeit adapted to RX path architecture specifics). These possible implementations of RX delay circuitry 70 include (1) use of several programmable delays cells and a multiplexer for cascading (e.g., as in FIG. 3), (2) use of bandgap for accurate delay generation, and (3) analog adjustment of delay by changing power supplies voltage on chain of delay cells (e.g., as in FIG. 5).

Figure 9:
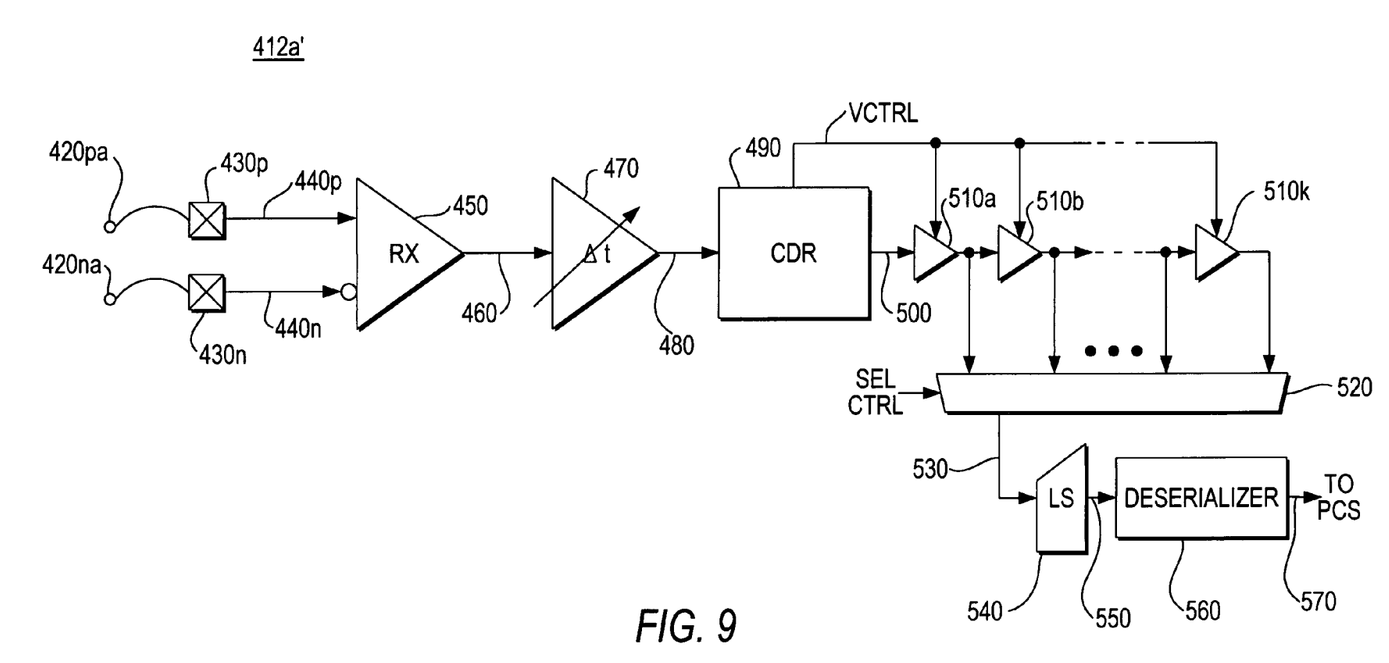
FIG. 9 is a simplified schematic block diagram of an illustrative embodiment of a representative portion of the FIG. 8 circuitry with optional additions in accordance with the invention.

FIG. 9 shows one representative channel from FIG. 8 with possible additional controllable delay circuitry in accordance with the invention. In the illustrative embodiment shown in FIG. 9 this additional delay circuitry is downstream from CDR circuitry 490 and operates on recovered serial data signal 500. As shown in FIG. 9, signal 500 is applied to a series of delay cells 510a-510k, which may be or may be like voltage controlled oscillator ("VCO") delay cells. Similar such VCO delay cells are typically included in VCO circuitry that is part of CDR circuitry 490. Within CDR circuitry 490 the VCO is controlled by charge pump circuitry so that the VCO matches the frequency of the incoming serial data signal. For example, the frequency match thus referred to may be frequency equality, or there may be some predetermined ratio (typically an integer ratio like 2:1 or 4:1) between the frequency of the incoming serial data and the VCO frequency.

In the embodiment shown in FIG. 9 the output signal of the above-mentioned charge pump circuitry or a signal derived from or like that signal is the depicted VCTRL signal. This signal is used to control the speed of operation of each of delay cells 510 (similar to the way in which the charge pump output signal in CDR circuitry 490 controls the speed of operation of the VCO delay cells in the VCO in circuitry 490). The output signal of each of delay cells 510 is applied to a respective one of the inputs to multiplexer circuitry 520. Circuitry 520 is controllable by its select control ("SEL CTRL") input signal(s) to select any one of its primary input signals (from delay cells 510) as its output signal 530. This output signal is applied to level shifter circuitry 540 (similar to other, earlier-described level shifter circuitry). The output signal 550 of level shifter circuitry 540 is applied to deserializer circuitry 560, which may assemble several successive serial bits into a parallel byte or word 570 for application to PCS circuitry of the device for further processing of the kind(s) mentioned earlier.

Embodiments of the type shown in FIG. 9 give one the ability to create accurate, multi-UI, receiver channel delay adjustments that are data-rate agile (i.e., that automatically adapt to or change with changes in incoming data rate). This data-rate agility is the result of using the CDR VCO charge pump output signal or the like (VCTRL) to control the speed of operation of delay cells 510. It will be appreciated that this control voltage is readily available in systems of this kind, and that it is produced independently in each channel (e.g., 412a-412n in FIG. 8). Thus this type of embodiment gives one the ability to create a controllable, long but very accurate, delay circuit in PMA vs. PCS, thereby avoiding a latency penalty when such delay is not needed.

As a possible alternative to placing the structure of elements 510, 520, and 540 downstream from CDR circuitry 490 as shown in FIG. 9, that type of structure could instead be placed before the CDR circuitry (similar to element 470 in FIG. 9). In either case (before or after CDR circuitry 490), fine and coarse adjustments can be combined to provide a very versatile system. Although either configuration is possible, the configuration shown in FIG. 9 is presently preferred because it is believed that this will lead to a better bit error rate ("BER") performance. This is thought to be so because it is better to place the jitter impact of the long delay chain 510 away from the CDR data-capturing path (i.e., after CDR circuitry 490) so that this jitter will have no impact on the bit-recognition process in the CDR phase detector. Also note that level shifter circuitry 540 is placed after delay cells 510 to convert the signal back to CMOS power supply level, and hence making this implementation truly data-rate independent.

Figure 10:
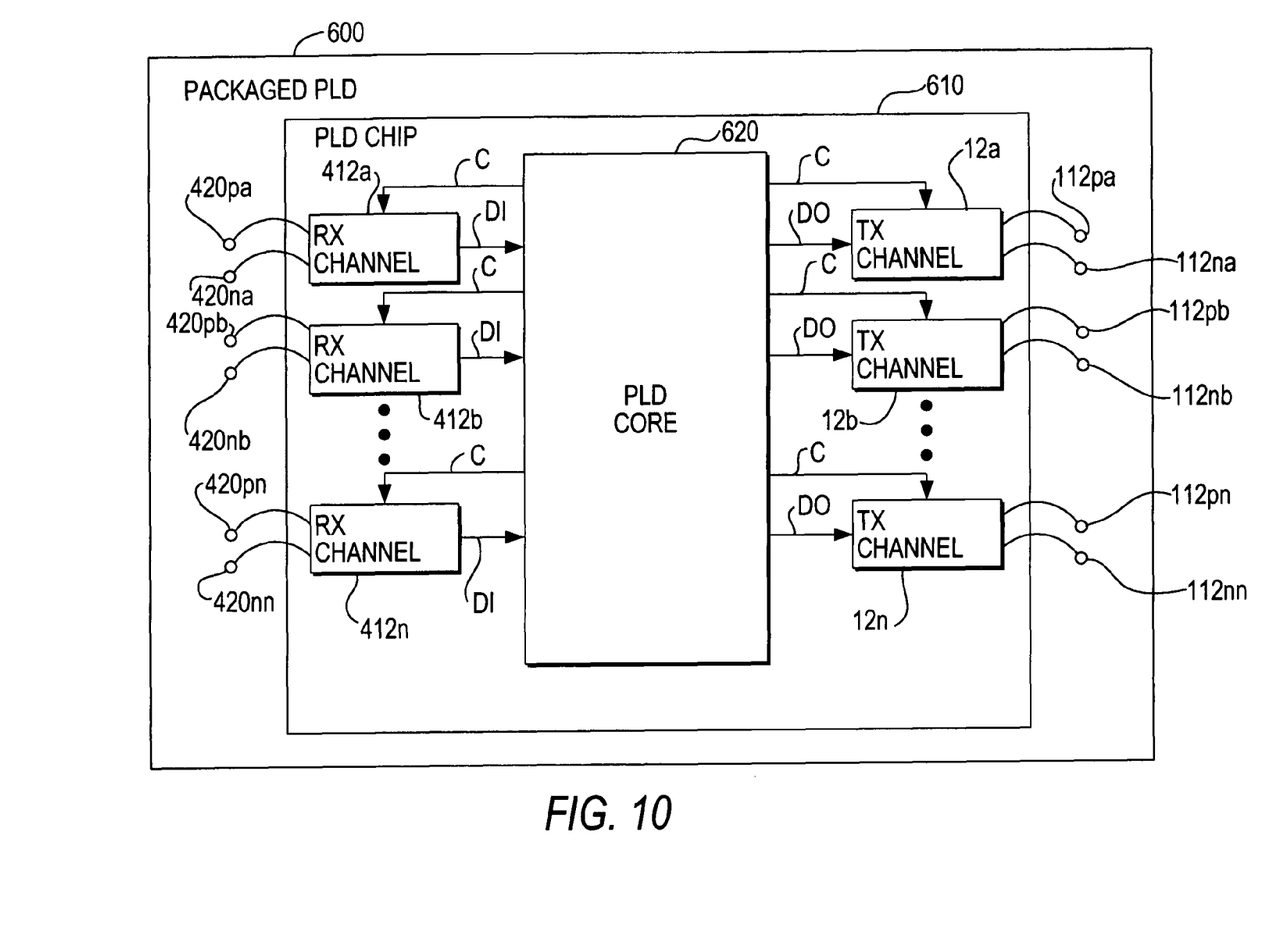
FIG. 10 is a simplified schematic block diagram of an illustrative context in which circuitry of the types shown in the earlier FIGS. can be employed in accordance with the invention.

FIG. 10 illustrates employing transmitter and/or receiver circuitry in accordance with the invention in the context of a packaged programmable logic device ("PLD") 600. PLD chip 610 is mounted within package 600. Package pins 112 and 420 are provided for making connections external to device 600. PLD chip 610 includes transmitter channels 12a-12n and/or receiver channels 412a-412n. In FIG. 10 each of these channels is assumed to include both PMA circuitry as shown in more detail in earlier FIGS. and PCS circuitry such as circuitry for encryption/decryption, encoding/decoding, rate matching, channel bonding, etc., at least some of which has been mentioned previously herein. PLD chip 610 also includes PLD core circuitry 620 such as programmable logic circuitry, memory circuitry, processor circuitry, etc. Core circuitry 620 can output data via leads referenced DO. It can receive data via leads referenced DI. It can output signals for controlling various aspects of the various channels via leads referenced C. For example, these control signals C may include signals for controlling the amount of delay effected by the various delay circuitries shown and described earlier in this specification.

Figure 11:
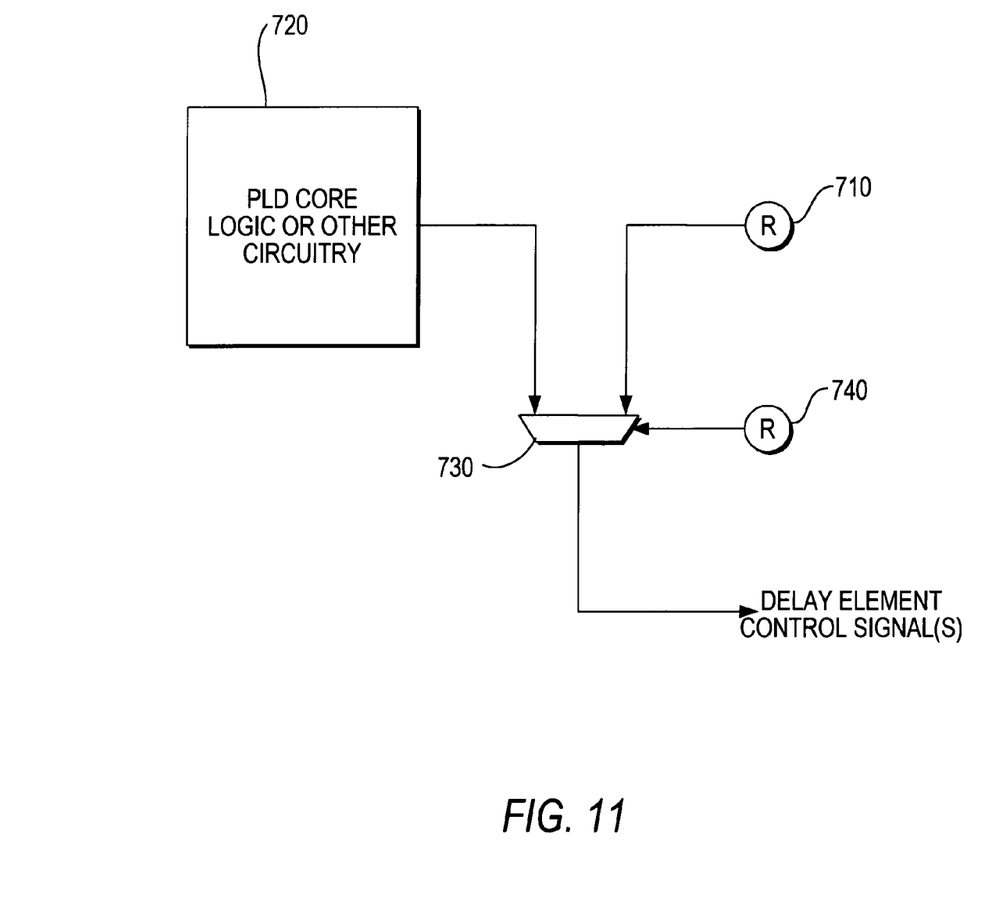
FIG. 11 is a simplified schematic block diagram of illustrative control circuitry in accordance with the invention.

FIG. 11 illustrates the point that signals for controlling the delay elements described earlier in this specification can be either programmable (e.g., from one or more programmable memory or configuration cells 710 of PLD chip 610 in FIG. 10) or from a more dynamic signal source 720 (e.g., PLD core logic 620 (FIG. 10) or the like). If it is desired to have a selectable option of either type of control, then multiplexer 730 may be provided for selecting the delay element control signal(s) to be used from either static or relatively static source 710 or from potentially more dynamic source 720. The selection made by multiplexer 730 is controlled by programmable memory or configuration cell 740.

It will be understood that the foregoing is only illustrative of the principles of the invention, and that various modifications can be made by those skilled in the art without departing from the scope and spirit of the invention. For example, the number of channels 12a-12n (FIG. 1) and/or 412a-412n (FIG. 8) employed can be any desired number(s). Similarly, the number of delay cells 210a-210k (FIG. 3), 212 (FIG. 4), 310a-310j (FIG. 5), and 510a-510k (FIG. 9) employed can be any desired number(s).

The invention claimed is:

1. Receiver circuitry comprising:
a plurality of circuit lanes, each receiving a respective serial data signal, and each including controllable delay circuitry for giving the serial data signal in the associated circuit lane a controllable amount of delay to compensate for skew among the serial data signals in the plurality of circuit lanes, wherein each of the plurality of circuit lanes further includes (1) clock and data recovery ("CDR") circuitry downstream from the controllable delay circuitry in that circuit lane for recovering both a clock signal and serial data from the serial data signal output by the controllable delay circuitry in that circuit lane and (2) further delay circuitry downstream from the CDR circuitry in that circuit lane for giving the serial data recovered by the CDR circuitry in that circuit lane a further controllable amount of delay, wherein the further controllable amount of delay is set by a control signal generated by the CDR circuitry.

2. Receiver circuitry comprising:
a plurality of circuit lanes, each receiving a respective serial data signal, and each including controllable delay circuitry for giving serial data in the associated circuit lane a controllable amount of delay to compensate for skew among the serial data signals in the plurality of circuit lanes, wherein each of the plurality of circuit lanes further includes clock and data recovery ("CDR") circuitry upstream from the controllable delay circuitry in that circuit lane for (1) recovering both a clock signal and the serial data from the serial data signal in that circuit lane, and (2) generating a control signal to set the controllable amount of delay given to the serial data recovered by the CDR circuitry in that circuit lane.

3. Receiver circuitry comprising:
a plurality of circuit lanes, each receiving a respective serial data signal, and each including controllable delay circuitry for giving the serial data signal in the associated circuit lane a controllable amount of delay to compensate for skew among the serial data signals in the plurality of circuit lanes, wherein each of the plurality of circuit lanes further includes clock and data recovery ("CDR") circuitry including voltage controlled oscillator ("VCO") circuitry for recovering both a clock signal and serial data from the serial data signal in that circuit lane, and wherein the delay circuitry in each of the plurality of circuit lanes is downstream from the CDR circuitry in that circuit lane and is at least partly controlled by a signal derived from the VCO circuitry in that circuit lane to give a controllable amount of delay to the serial data recovered by the CDR circuitry in that circuit lane.

4. Receiver circuitry comprising:
a plurality of circuit lanes, each receiving a respective serial data signal, and each including controllable delay circuitry for giving the serial data signal in the associated circuit lane a controllable amount of delay to compensate for skew among the serial data signals in the plurality of circuit lanes, wherein each of the plurality of circuit lanes further includes clock and data recovery ("CDR") circuitry including voltage controlled oscillator ("VCO") circuitry, wherein the delay circuitry in each of the plurality of circuit lanes is at least partly controlled by a signal derived from the VCO circuitry in that circuit lane, wherein the delay circuitry in each of the plurality of circuit lanes comprises a plurality of delay cell circuits connected in a series, and wherein the signal derived from the VCO circuitry in each of the plurality of circuit lanes is used to affect speed of operation of the delay cell circuits in that circuit lane.

5. Receiver circuitry comprising:
a plurality of circuit lanes, each receiving a respective serial data signal, and each including controllable delay circuitry for giving the serial data signal in the associated circuit lane a controllable amount of delay to compensate for skew among the serial data signals in the plurality of circuit lanes, wherein each of the plurality of circuit lanes further includes clock and data recovery ("CDR") circuitry including voltage controlled oscillator ("VCO") circuitry, wherein the delay circuitry in each of the plurality of circuit lanes is at least partly controlled by a signal derived from the VCO circuitry in that circuit lane, wherein the VCO circuitry in each of the plurality of circuit lanes includes charge pump circuitry, and wherein the signal derived from the VCO circuitry in each of the plurality of circuit lanes is an output signal of the charge pump circuitry of that VCO circuitry.

6. The circuitry defined in claim 4 wherein the delay circuitry in each of the circuit lanes further comprises:
selection circuitry that can controllably select an output signal of any of the delay cell circuits in that circuit lane as a delayed data signal of that circuit lane.

7. The receiver circuitry of claim 1, wherein the further delay circuitry in a given circuit lane receives the serial data and the control signal from the CDR circuitry in that circuit lane.

* * * * *